(No Model.)

H. C. SEWARD.
FEED TROUGH.

No. 410,563. Patented Sept. 3, 1889.

Witnesses
W. E. Bowen
Benj. Miller

Inventor:
Henry C. Seward,
By J. E. M. Bowen
Attorney.

UNITED STATES PATENT OFFICE.

HENRY C. SEWARD, OF MOUNT OLIVE, NEW JERSEY.

FEED-TROUGH.

SPECIFICATION forming part of Letters Patent No. 410,563, dated September 3, 1889.

Application filed December 21, 1888. Serial No. 294,266. (No model.)

*To all whom it may concern:*

Be it known that I, HENRY C. SEWARD, a citizen of the United States, and a resident of Mount Olive township, in the county of Morris and State of New Jersey, have invented a certain new and useful Improvement in Feed-Troughs, of which the following is a specification.

My improvement is directed to troughs for feeding cattle, hogs, and the like; and the object of my improvement is to secure a free and equal distribution of the food into each feeding-compartment and to produce a construction and arrangement of parts for effecting the same object, as will be hereinafter described, and made the subject of specific claim.

Figure 1:
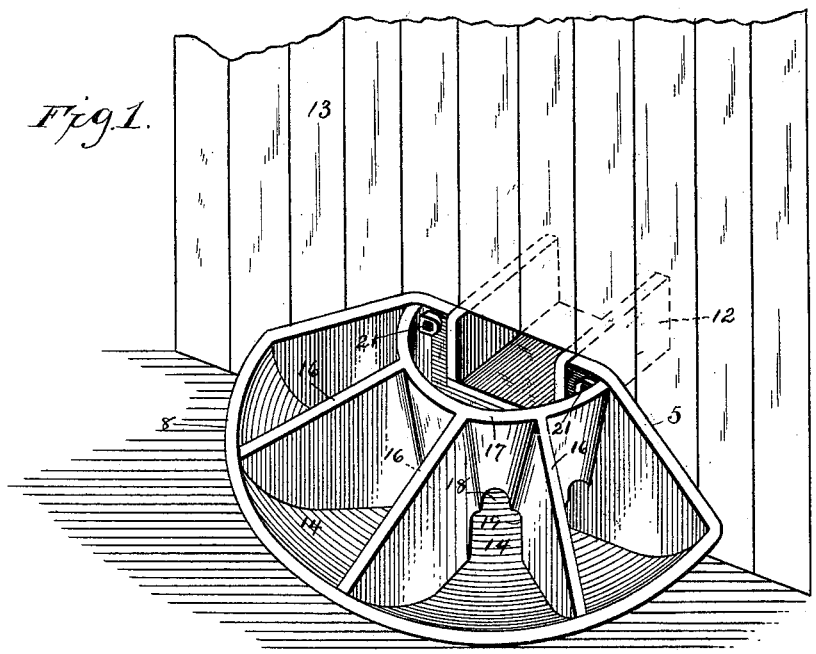
Figure 2:
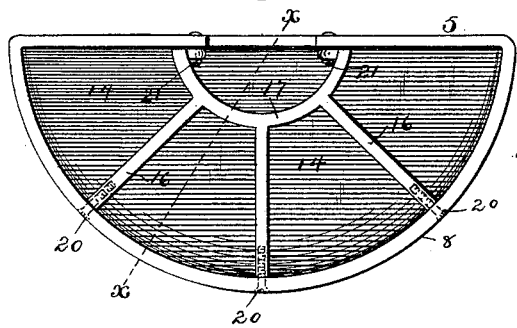
Figure 3:
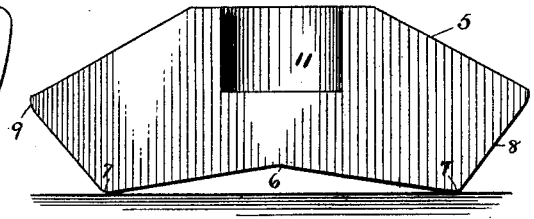

In the accompanying drawings, which form a part of this description, and in which like features are indicated by like figures of reference in the several views, Figure 1 is a perspective view of a trough embodying my invention and made to accommodate four animals at the same time. Fig. 2 is a top plan view of the same trough. Fig. 3 is a rear elevation of Fig. 2; and Fig. 4 is a cross-section through the line $x\ x$ of Fig. 2, looking to the right.

The trough shown in the drawings embodies four feeding-compartments and is the half of a complete circle, the back of the receptacle being flat and substantially perpendicular, while the front is rounding and inclined outwardly from a perpendicular line. The trough may be made of twice the capacity of the one shown in the drawings by duplicating the half-circle or extending the lines to form a complete circle, in which case the chute for supplying the trough with food would enter from the top, and not from the back, as shown in the present illustration of the invention. A circular or eight-compartment trough will be found well adapted for use in a building of more than one story, where the feed is above the first floor and is to be passed to the trough located below. The four-compartment trough, while it may be used in the field, is more especially designed to be placed on a platform or otherwise at the side of a fence, or on the floor at the side of a partition in a pen or room, the chute in either case entering at the back of the trough through the fence or partition, as shown in Fig. 1, for example. The perpendicular flat surface at the back of the trough illustrated renders this disposition of the trough practicable, and when so arranged the food may be supplied without waste and in a cleanly manner and without annoyance from the cattle to be fed.

Figure 4:
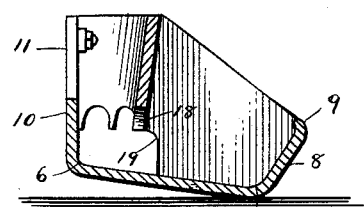

Referring to the drawings, 5 indicates a receptacle whose cross-section is shown in Fig. 4. Its depth is sufficient to contain a reasonable supply of food, and the highest point of its bottom is located centrally at the back in the trough illustrated, and would be exactly in the center were the half-circle extended to form a full circle, which would be the case were the trough doubled in capacity, so as to contain eight instead of only four compartments. From this central point of highest elevation, which is indicated by 6, the bottom slopes uniformly toward the front to the point 7, where it joins the outwardly-inclined front wall 8 of the receptacle, and is integral therewith. The surface within the trough at the point 7 is not angular, but rounding, as shown in Fig. 4, to better enable the animal to remove the food with its tongue, and the edge of the front wall 8 is turned slightly inward on a curved line, as at 9, to prevent the food from splashing out of the trough, the smooth surface furnished by the curved line offering no obstruction to the tongue of the animal, as would an angular point of juncture. Midway of the flat perpendicular back 10 of the trough the same is cut away, as shown at 11, to permit the chute 12 to be placed therein, the chute, as before explained, preferably extending through an opening made in a partition or fence 13, in order that the food may be supplied to the trough through the chute without annoyance from the animals.

The receptacle 5 is divided into a series of compartments 14 by means of the removable device, which consists of equidistant partitions 16, connected to a half-cylindrical perpendicular member 17. The parts 16 and 17 are preferably cast integral, as shown, and their top surfaces, when the device is in position within the body of the trough, are on a level with the top edges of the walls of the body of the trough. The bottom edges of the partitions 16 are formed to correspond to the slope of the interior surface of the trough, and at the back of each compartment 14 the curved perpendicular wall of the member 17 is cut out on a curved line, as at 18, each partition being likewise cut away, as at 19. The openings thus formed between the several compartments 14 and the space at their rear, into which the food from chute 12 is emptied, permits the food as it falls from the chute and strikes the elevated point 6 of the bottom of the trough to flow forward and equally distribute itself within the several compartments. The curved lines of the openings just described facilitate the removal of the food by the tongue of the animal from that part of the trough back of the perpendicular partition 17.

The device comprising parts 16 and 17 is removably held in place within the body of the trough by means of screws 20 entering the partitions 16 and having their heads countersunk in the wall 8 of the body of the trough, and by nuts 21 co-operating with screw-bolts fixed to the back wall 10 and passing through ears on the curved member 17.

This trough will preferably be made of cast-iron, though it may be made of other metals or materials. Its freedom from complications renders it efficient for the purpose for which it is designed, and also easy of construction. It is not liable to derangement, and its cost of production is comparatively little.

I am aware that a trough for feeding hogs and other cattle has been constructed of two separate and distinct parts in a manner to form separate and distinct feeding-compartments, each compartment being separately and only fed from a central food-reception compartment, and I do not broadly claim such a thing; but a distinguishing feature of my improvement consists in the provision whereby each compartment is made to communicate not only with the central food-containing compartment, but with each other at a point to insure the uniform supply of food from the same source into each compartment and prevent the clogging of such communication, for it will be seen that if the direct communication of the central food-supplying compartment with any one of the feeding compartments should become clogged the openings in the feeding-chamber forming partitions would at once give the supply around the clogged point and through openings in the partitions. This is an important advantage in a device of this kind, for cattle in feeding are liable to push the food back toward these communications, and the advantage of the openings in the partition communicating with each feeding-compartment and with the food-supplying compartment is apparent, as the food can pass direct from the central supply into a feeding-compartment, or sidewise therein from another feeding-compartment, as well as from the central supply through such side partition-opening.

Having thus described my invention, what I claim as new, and desire to secure by Letters Patent, is—

A trough for feeding cattle and the like, consisting of the base-receptacle having a vertical back, a downwardly-inclined bottom joining the lower edge of the vertical back, an outwardly-inclined front wall slightly turned inward at its top at 9 to prevent the food working over the edge, and curved at its junction with the bottom at 7, and a separate device having a curved back and radial partitions seated and secured within said base-receptacle, the said back wall and the partitions being cut away at their junction with the inclined bottom, all as shown and described.

Signed at New York, in the county of New York and State of New York, this 1st day of November, A. D. 1888.

HENRY C. SEWARD.

Witnesses:
J. E. M. BOWER,
HUGO KOELKER.